United States Patent [19]

Cole et al.

[11] 4,140,017
[45] Feb. 20, 1979

[54] ADJUSTABLE THERMAL ACTUATOR

[75] Inventors: Albert Cole, Cockermouth; Ronald F. Sturgeon, Bognor Regis, both of England

[73] Assignee: Thermoforce Limited, Cockermouth, England

[21] Appl. No.: 831,081

[22] Filed: Sep. 6, 1977

[30] Foreign Application Priority Data

Sep. 21, 1976 [GB] United Kingdom ............ 39113/76

[51] Int. Cl.² ............................................. G01K 5/48
[52] U.S. Cl. ................................. 73/363; 73/362.4; 73/362.6; 73/362.7
[58] Field of Search ................ 73/362.4, 362.6, 362.7, 73/363, 368, 368.3; 60/527

[56] References Cited

U.S. PATENT DOCUMENTS

| 3,019,653 | 2/1962 | Swales et al. | 73/368.3 |
| 3,183,720 | 5/1965 | Baker | 73/368.3 |
| 3,404,530 | 10/1968 | Churchill et al. | 60/527 |
| 3,968,692 | 7/1976 | Blattler et al. | 73/363 |

Primary Examiner—Charles Gorenstein
Attorney, Agent, or Firm—Shoemaker and Mattare, Ltd.

[57] ABSTRACT

A temperature responsive device, for example for controlling a ventilator or a valve, is provided which comprises a cylinder containing a substance which expands on being heated, thermal expansion of the substance causing expulsion of a piston rod from the cylinder. The device is characterized in that the piston rod constitutes a primary piston which passes through a central bore of a secondary piston which is movable axially in the bore of the cylinder, and in that there is provided threaded onto one end of the cylinder and surrounding the piston rod a sleeve which serves to limit movement of the secondary piston in one direction, with rotation of the sleeve relative to the cylinder being used to adjust the effective volume of the cylinder.

4 Claims, 1 Drawing Figure

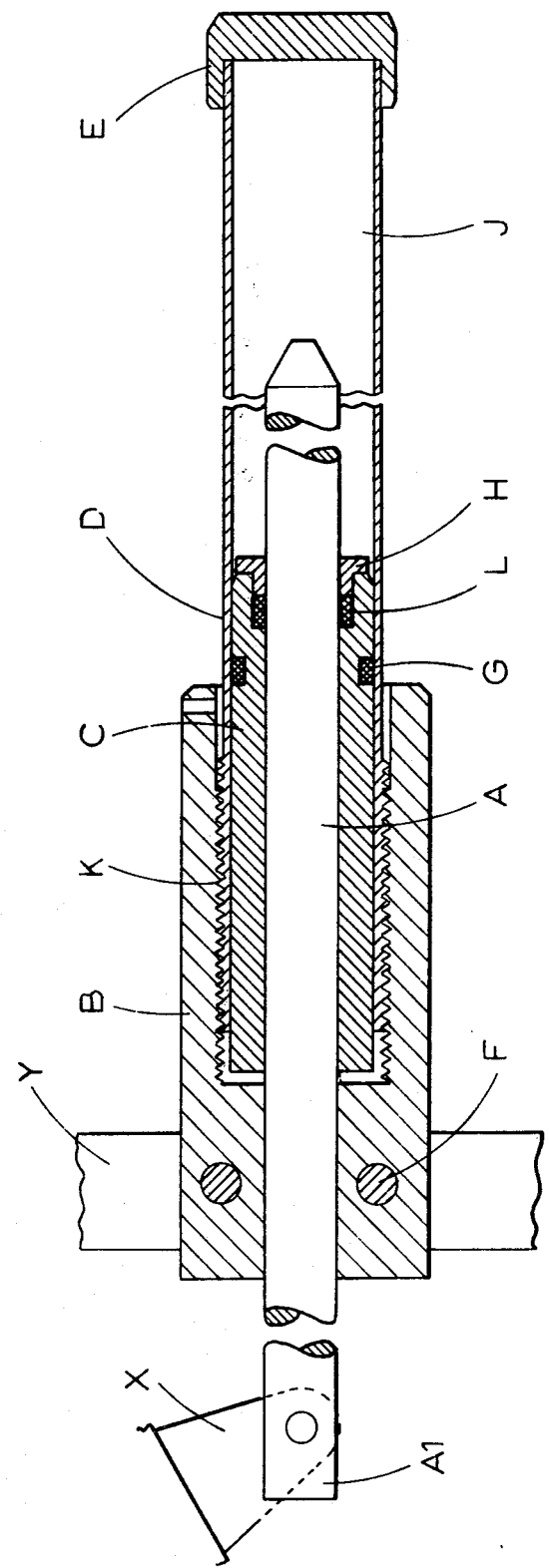

ADJUSTABLE THERMAL ACTUATOR

This invention relates to temperature responsive devices of the kind utilizing the volumetric expansion of substances or compositions having high coefficients of thermal expansion. Typical of such substances are waxes or jellies, and in particular a mixture of paraffin wax and petroleum jelly. The volumetric expansion and contraction of such substances occurring when there is a change in the ambient temperature is employed to operate mechanisms such as bell cranks or linkages, say for controlling ventilators, windows, fanlights, shutters, valves and so forth.

Temperature responsive actuating devices which utilize the volumetric expansion and contraction of a substance have been proposed which essentially include a straight tubular cylinder containing the substance and immersed in said substance a rod which is constituted as a piston and extends into the cylinder through a close fitting guide means incorporating a gland seal.

Such a temperature responsive actuating device has been described in, for example, British Patent Specification No. 886,241. However, such devices are usually only operative under relatively narrow ranges of temperature variation, or they are incapable of fine calibration and adjustment on site in a particular environment. Devices of greater complexity and cost have been proposed. For example in U.S. Pat. No. 3,019,653 there is disclosed a device which employs two different fluid substances which are respectively inserted in selected amounts so as to obtain calibration. Such an arrangement presents certain difficulties to the installer or user. Other prior art devices have sought to provide for operation under a wide range of temperature variation by employing relatively large volumes of the temperature responsive expansive substance, but such measures suffer the disadvantage that due to the large mass employed the distribution of heat throughout involves delay and hence the device responds slowly to changes of temperature.

This invention relates to the provision of a thermal actuator of simple and inexpensive construction, which is capable of being effective under a relatively wide range of temperature during operation and which can be adjusted to suit the range of ambient temperature expected in its operational environment, the dimensional size of a particular installation and load and which may be calibrated when installed.

Accordingly the invention provides a temperature responsive actuating device comprising a cylinder containing a substance having a high coefficient of thermal expansion, a rod constituting a piston and placed in said cylinder so as to be urged outwardly from the cylinder when the substance expands, characterised in that the rod constitutes a primary piston and passes through a central bore of a secondary piston which is movable axially of the bore of the cylinder, there being seal means operating firstly between the primary piston and the secondary piston, and secondly between the secondary piston and the cylinder, the device being further characterised in that there is provided threaded onto one end of the cylinder and surrounding the rod a sleeve which serves to limit movement of the secondary piston in one direction, rotation of the sleeve relative to the cylinder being used to adjust the effective volume of the cylinder.

The piston rod is provided at its end opposite its immersed end with means for clamping it to the installation to one element of a load, the other element of the load being clamped to the housing sleeve. One element of the load may be, for example, a fixed window frame and the other element of the load will be a window hinged to said frame.

The sole drawing shows an exemplary embodiment of the invention.

Referring to the drawing, A represents a primary piston comprising a plain cylindrical rod which extends from one end $A_1$ adapted to be fixed to one element of a load, into a cylindrical container D which contains a substance J which expands when the ambient temperature increases and contracts when the ambient temperature decreases.

A suitable substance is a mixture of wax and petroleum jelly which expands by about 15% when the temperature rises from 10° C. to 50° C.

The piston rod A extends through a secondary piston C which is also slidably movable within the cylinder D. A gland seal L suitably of nitrile rubber, is disposed between piston A and secondary piston C, while a gland seal G is also suitably of nitrile rubber, is disposed to operate between secondary piston C and the cylinder D.

The cylinder D is externally threaded at K to engage an internally threaded bore of a housing sleeve B. The sleeve B has means, for example holes, whereby it may be fixed to a second element Y of a load.

The elements X and Y of the load may for example be respectively a window frame and the window hinged to the said frame. The device also may be employed to operate mechanisms such as bell cranks or linkages for controlling valves, ventilators, shutters, fanlights and so forth.

When the device is to be installed, the piston rod A is fixed at its end $A_1$ to the load element X; the cylinder D is filled with the expansive substance J; the secondary piston C is entered into the cylinder and the cylinder is screwed half-way into the housing sleeve B. The piston rod A is then inserted through an end hole in the bush B with which it has clearance, and through a bore of the secondary piston C and pushed past the gland seal L as far as necessary into the cylinder D as to bring the fixing point F of the housing sleeve B into the desired position for attachment to a second element Y of the load. The sleeve B is then secured as desired to the load element Y.

As the main piston is being pushed into the cylinder D some of the expansive substance J will be displaced and means (not shown) may be provided to allow such excess expansive substance to escape from within cylinder D.

Finally adjustment of the device can now be obtained by rotating the cylinder D to move it one way or the other relative to the housing sleeve B utilizing threads K. The rotation of cylinder D is suitably effected by means of a knurled end nut E. Gland seal L is advantageously placed under compression by an end cap H on the secondary piston C.

Once installed, any rise in ambient temperature will cause the substance J to expand. Upon such expansion the secondary piston will first be pushed axially out of the cylinder D until it abuts with bush B. Upon further expansion of the substance J, useful work will be done and the main piston A will be expelled from within the cylinder D.

Adjustment after installation may be carried out; for example, rotating the cylinder D in one direction relative to the sleeve B will increase the movement permitted to the secondary piston C before useful work is done; on the other hand, by screwing the cylinder D into sleeve B the movement permitted to the secondary piston C will be reduced.

A spring may be placed around the rod A to operate between the secondary piston C and the sleeve B.

By these means the restricted effective length of the temperature responsive actuator may be adjusted to suit the particular requirements at any expected temperature in the environment of the installation.

We claim:

1. A temperature responsive actuating device comprising a cylinder containing a substance having a high coefficient of thermal expansion, a rod constituting a piston and placed in said cylinder so as to be urged outwardly from the cylinder when the substance expands, characterised in that the rod constitutes a primary piston and passes through a central bore of a secondary piston which is movable axially of the bore of the cylinder, there being seal means operating firstly between the primary piston and the secondary piston, and secondly between the secondary piston and the cylinder, the device further comprising means to vary the volume of the cylinder characterised in that there is provided threaded onto one end of the cylinder and surrouding the rod a sleeve which serves to limit movement of the secondary piston in one direction, rotation of the sleeve relative to the cylinder being used to adjust the effective volume of the cylinder.

2. A temperature responsive actuating device comprising: a hollow cylinder containing a substance having a high coefficient of thermal expansion; a rod constituting a piston and placed in said cylinder so as to be urged outwardly from the cylinder when the substance expands; a cylindrical hollow bush constituting a secondary piston and located in the cylinder towards one end thereof, said bush being movable axially of the cylinder; said rod passing thorugh a central bore of said bush; an annular gland seal on said bush engaging said rod to provide sealing while permitting axial movement of the rod in and relative to the bush; an annular recess defined on the external cylindrical periphery of said bush; a sealing ring located in said annular recess sealing against a cylindrical bore of the cylinder; means for varying the volume of the cylinder; and limiting means for limiting movement of said bush axially within the cylinder in at least one direction.

3. A temperature responsive actuating device according to claim 2, characterised in that said bush is constituted and arranged to move axially of the bore of said cylinder and wherein said limiting means includes means for adjusting movement of said limiting means axially of the cylinder so that the amount of movement permitted to said bush in said one direction is adjustable.

4. A temperature responsive actuating device according to claim 2, wherein in its operative condition the device is arranged between two load elements to control relative movement between those elements in dependence upon change of ambient temperature, characterised in that the rod is connected at its end remote from its end immersed in the substance contained in the cylinder to one of said two elements, and wherein the device further includes a screw thread means connecting the second element to the cylinder and being so arranged that manual rotation of the cylinder is effective by way of said screw thread means to alter the effective distance between the second element and the cylinder, thereby to permit adjustment of the temperature responsive actuating device in its operative installed condition.

* * * * *